United States Patent [19]

Goossen

[11] Patent Number: 4,951,037

[45] Date of Patent: Aug. 21, 1990

[54] DISPLAY SEGMENT FAULT DETECTION APPARATUS

[75] Inventor: Emray R. Goossen, Albuquerque, N. Mex.

[73] Assignee: Honeywell Inc., Minneapolis, Minn.

[21] Appl. No.: 169,540

[22] Filed: Mar. 17, 1988

[51] Int. Cl.[5] .............................................. G09G 3/20
[52] U.S. Cl. .................................... 340/715; 340/756
[58] Field of Search ............... 340/715, 765, 784, 756; 346/641, 642

[56] References Cited

U.S. PATENT DOCUMENTS

| | | | |
|---|---|---|---|
| 4,113,361 | 9/1978 | Nakano | 340/765 |
| 4,311,993 | 1/1982 | Strobel | 340/715 |
| 4,420,748 | 12/1983 | Jurgen | 340/715 |
| 4,541,066 | 9/1985 | Lewandowski | 340/715 |

Primary Examiner—Alvin Oberley
Attorney, Agent, or Firm—Seymour Levine; Albin Medved; Roger W. Jensen

[57] ABSTRACT

Fault detection apparatus for segmented digital displays of a capacitive nature. Current probes interposed between the segment drivers and the segments detect the current pulses required by the on and off segments resulting from the square wave energization applied thereto. Discrepancies between the current pulses and the commanded data provide segment fault status. A serial bus transmits the display data from a Control Unit to the display and transmits the Segment Status Data from the display to the Control Unit. The current pulses are sampled pursuant to a pulse mode or square wave mode of operation.

9 Claims, 8 Drawing Sheets

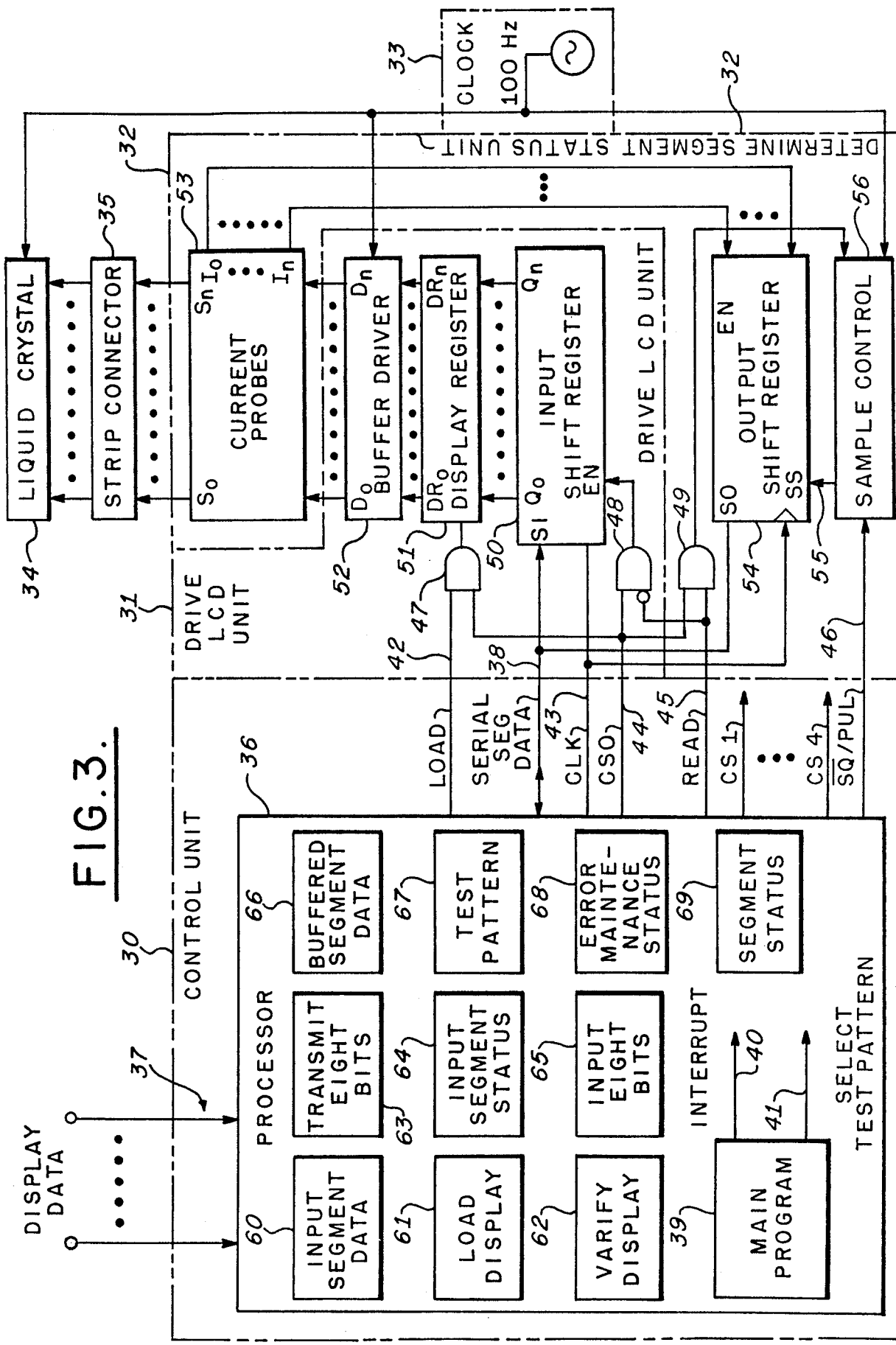

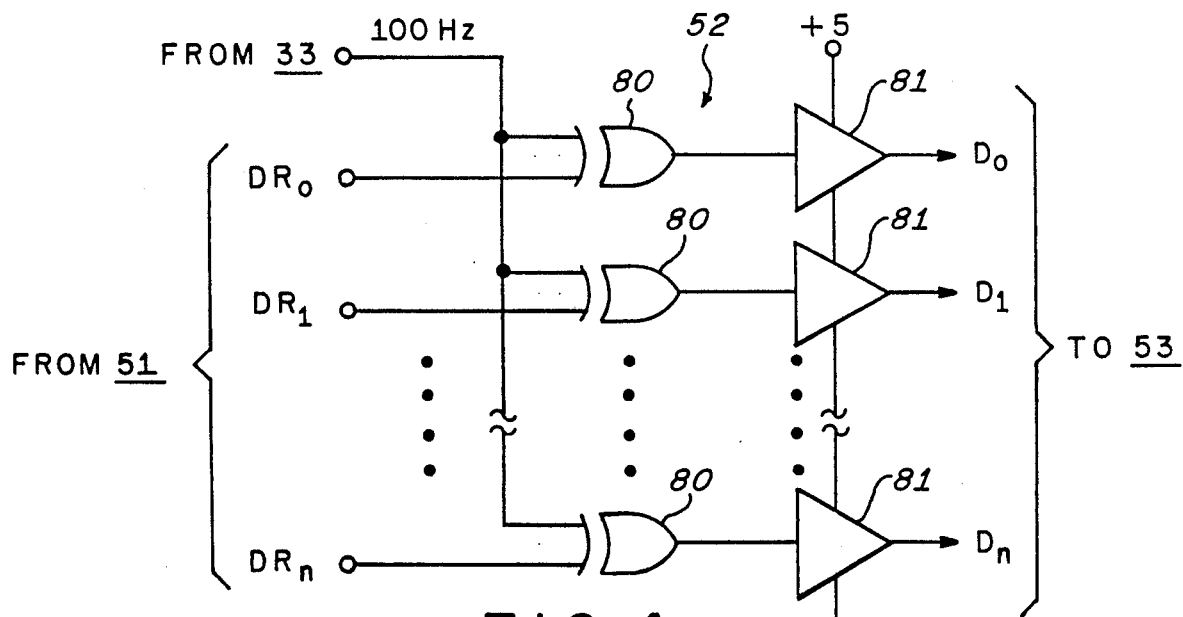
FIG. 4.
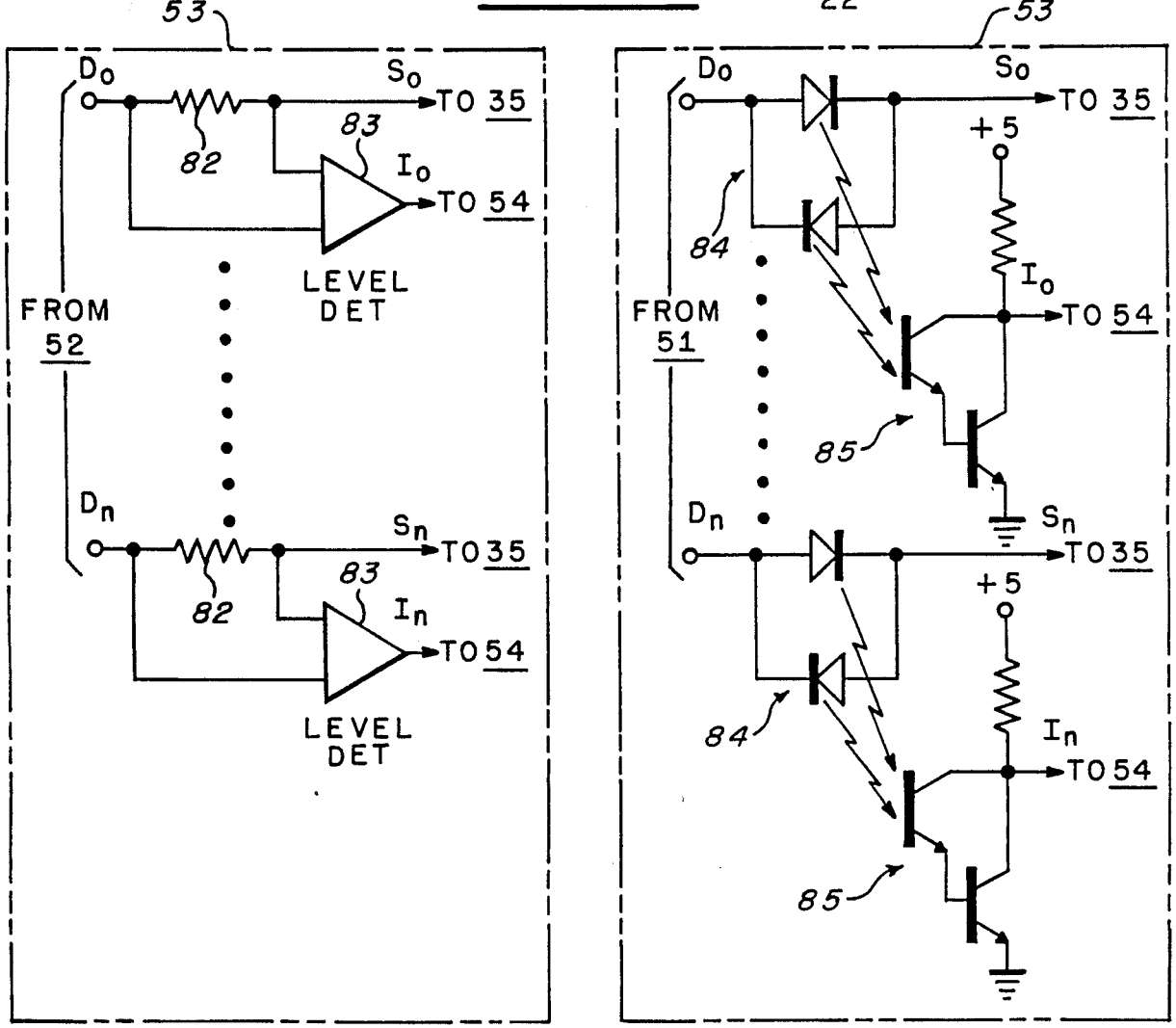
FIG. 5A.
FIG. 5B.

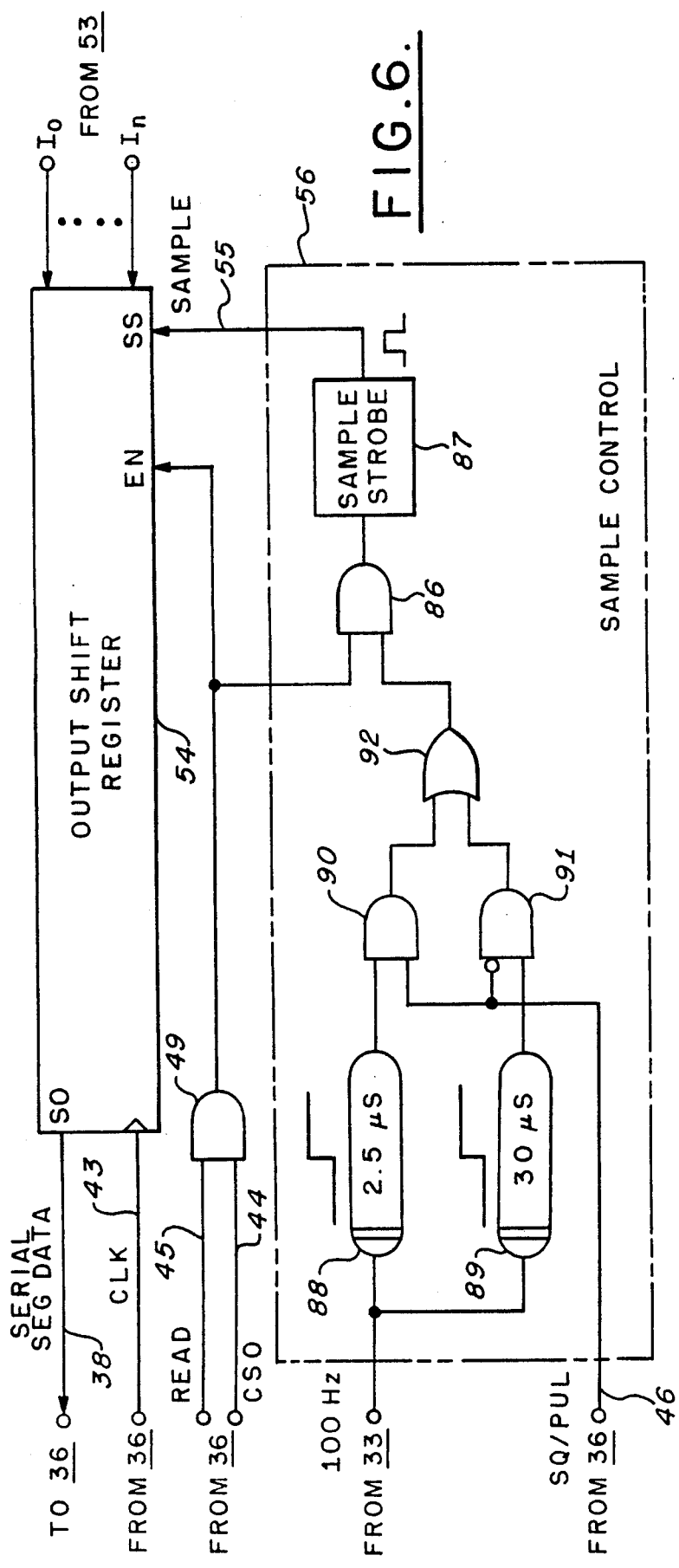
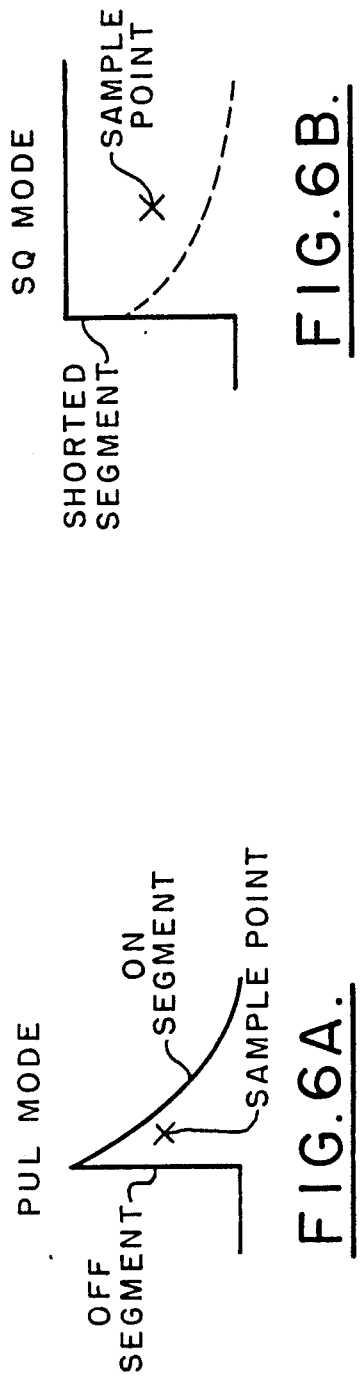

DISPLAY SEGMENT FAULT DETECTION APPARATUS

BACKGROUND OF THE INVENTION

1. Field of the Invention

The invention relates to fault detection apparatus for digital displays particularly with respect to seven segment numeric displays having a capacitive characteristic, such as liquid crystal displays (LCD) and electro luminescent displays (EL).

2. Description of the Prior Art

The replacement of numerical mechanical displays by digital electronic displays in industrial applications, such as avionics, has engendered a significant reliability problem. The problem is especially severe where the information is safety critical to, for example, aircraft operating crews and passengers or to the process being controlled. Each digit of such displays is typically embodied by an array of seven segments arranged and operated to selectively display the decimal digits zero to nine. Four of the segments are oriented vertically as spaced vertical pairs and the remaining three segments are disposed horizontally at the top, center, and bottom of the digit array. The segments of such displays are typically implemented by light emitting diodes (LED), gas discharge elements, liquid crystal elements (LCD), electro luminescent elements (EL) and the like.

Most failures where a segment is either erroneously on or erroneously off result in characters that will appear to the user as obviously non-numeric. There are, however, fifteen single segment failures which result in non-obvious faults where a decimal digit is displayed other than the digit commanded. Thus, erroneous information is displayed to the user which can precipitate a dangerous situation. For example, such faults are critical in an avionics altitude indicator which instead of displaying the commanded altitude of 3000 feet, erroneously displays 9000 feet.

A prior art solution to the reliability problem existing with such displays is to provide a user initiated push to test configuration where the results are verified by the user. The push to test verification procedure may, for example, provide a flashing display of figure eights where energization is continuously applied and removed from all of the segments. Erroneously on and off segments may be detected by this procedure. Probability analysis utilizing the failure rate of the components combined with exposure time determines the maximum time interval between tests. Such user initiated tests suffer from the disadvantage that human judgement is utilized to verify the validity of segments and hence the test is subject to human error. Additionally, human error may result in the test not being performed within the specified time intervals. Such testing also fails to provide maintainence monitoring data for retrieval by maintainence personnel.

A prior art example of apparatus for providing digital display segment verification is disclosed in U.S. Pat. No. 4,307,392 issued Dec. 22, 1981. The apparatus of said U.S. Pat. No. 4,307,392 is particularly designed for LED type displays and detects failure by a segment voltage level measurement. Such apparatus cannot be utilized with a liquid crystal type display because liquid crystal segments exhibit a capacitive nature and, therefore, cannot be verified by voltage level measurements. The apparatus of said U.S. Pat. No. 4,307,392 utilizes parallel data transmission and thus requires a significant amount of interconnection circuitry to the control unit. Such a parallel arrangement renders remotely locating the control unit with respect to the display difficult and impractical. Other prior art segment verification apparatus utilize current level measurements which also cannot determine segment status of capacitive segments such as in liquid crystal displays.

Another system for monitoring the status of segments in a digital display is disclosed in U.S. Pat. No. 4,247,852 issued Jan. 27, 1981. The apparatus of said U.S. Pat. No. 4,247,852 is designed for liquid crystal displays and measures the voltage level on a test lead connected to the segment. Voltage level comparisons between energizing leads and test leads provide the error status signal. Since the LCD segments are capacitive it is believed that such voltage level measurements will not provide effective error determination for many types of commonly occuring faults. For example, the failure of a segment driver to a high or low state or a segment to ground short may not be detectable by the apparatus of said U.S. Pat. No. 4,247,852. The requirement of an additional test lead for each segment of the LCD significantly increases the complexity thereof as well as the complexity of the associated electronic circuitry. The additional test lead per segment also precludes the utilization of commercially procureable LCD indicators which are generally not provided with such test leads.

None of the prior art apparatus provides a practical system for electronically verifying the operation of digital displays with segments of a capacitive nature. Segment status determination is effected by measuring a voltage level or a current level. Displays of a capacitive nature, such as LCD's, cannot effectively be verified by voltage level or current level measurements. The prior art apparatus requiring human intervention to initiate or verify the proper operation of all of the segments are subject to human error. Thus, the prior art does not provide effective automatic self testing apparatus for digital displays having segements of a capacitive nature.

SUMMARY OF THE INVENTION

The disadvantages of the prior art are overcome by apparatus that performs an automatic self test of a digital display having segments of a capacitive nature, such as an LCD or EL display. Segment status is determined by measuring the current pulses required to charge the effective capacitance of the segments for on segments and for off segments and comparing the current pulse measurements with the commanded data to detect segment failures. Data is transmitted to the display and segment status signals are transmitted from the display over a serial bus structure.

BRIEF DESCRIPTION OF THE DRAWINGS

FIG. 3 is a schematic block diagram of a system for driving and verifying, in accordance with the invention, segmented digital displays of a capacitive nature.

FIG. 4 is a schematic logic diagram of the buffer driver of FIG. 3.

FIG. 5a is a schematic diagram of the current probe of FIG. 3 utilized in determining segment status.

FIG. 5b is a schematic diagram of an alternative current probe for use in the system of FIG. 3.

FIG. 6 is a detailed logic diagram of the Sample Control and Output Shift Register circuits of the system of FIG. 3.

FIG. 6a is an illustration of the current pulses measured with respect to on and off segments and the sample point utilized in the pulse mode of measurement.

FIG. 6b is an illustration of the sample point utilized in the square wave mode of operation for detecting shorted segments.

DESCRIPTION OF THE PREFERRED EMBODIMENT

Figures 1A, 1B:
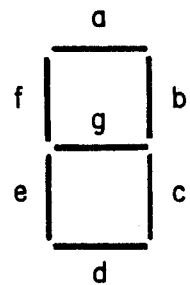
FIG. 1a is a diagram of the seven segments comprising one digit of a digital numeric display.
FIG. 1b is a chart illustrating all possible instances of single segment failures that result in a digit of a seven segment display indicating an incorrect number.

Referring to FIG. 1a, seven segments a–g are illustrated arranged in a conventional array for providing one digit of a decimal digital numerical indicator. Selective energization of the segments a–g form the decimal digits 0–9. A malfunctioning segment or its associated circuitry, which results in a segment being on when it should be off or off when it should be on, may result in a symbol that is clearly non-numeric thus representing to the user that a malfunction has occured. Conversely, however, such a malfunction may result in the display of a digit other than that commanded. In, for example, a digital altitude indicator for aircraft, an erroneous display of altitude to the pilot can precipitate a dangerous situation. For example, if the numeral 9 is commanded for which segments a–d, f and g should be on but segment f is erroneously off the numeral 3 is instead displayed.

Referring to FIG. 1b, all combinations of single segment failures that can result in the seven segment display of FIG. 1a being misinterpreted are illustrated. The failure situations resulting in display of a digit different from the commanded digit are encircled. The remaining situations represent either correct operation or a failure resulting in an obvious fault. There are 15 non-obvious faults and only the segments a,b,e,f and g contribute thereto.

Figure 2A:
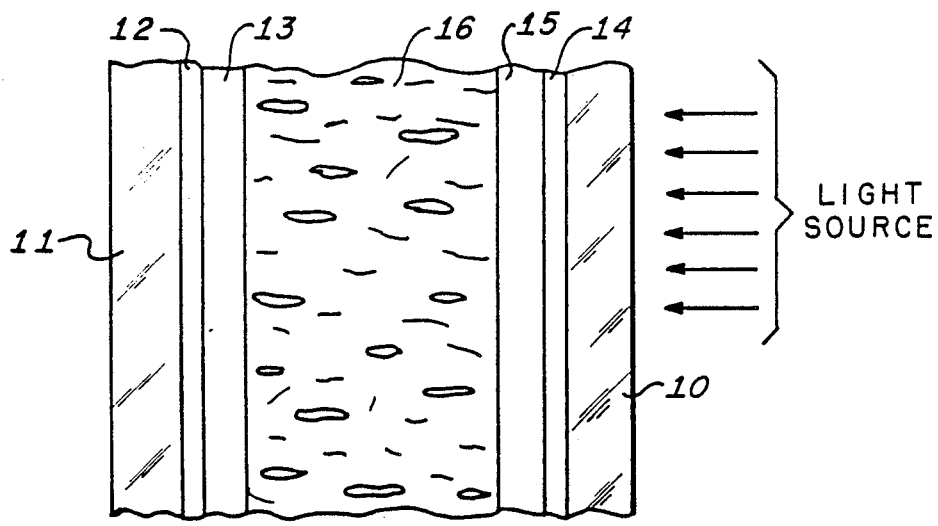
FIG. 2a is a cross sectional diagram of a portion of a liquid crystal display illustrating the construction thereof.

Referring to FIG. 2a, the construction of a liquid crystal display is illustrated. LCD material is sandwiched between two glass substrates 10 and 11 on which transparent electrodes are deposited. On the inner surface of the back substrate 11 a reflective surface 12 is deposited followed by a transparent electrode backplane 13. Deposited on the inner surface of the front substrate 10 is a polarizer 14 followed by transparent electrodes 15 formed in the shape of the segments illustrated in FIG. 1a. Each of the transparent electrodes 15 forms a small capacitive element for each segment with respect to the backplane 13. Althought not illustrated herein, electroluminescent displays have the same characteristics as the LCD since EL displays have a 5 layer sandwich construction comprising electrode, dielectric, phosphor, dielectric, and electrode. Both of these types of displays are driven by an alternating voltage which is typically a square wave with the "on" segment driven out of phase and the "off" segment driven in phase with the backplane. Since each segment is capacitive, the status of a segment can be measured, in accordance with the invention, by the existance or absence of a current pulse. Additionally an open connection between the driver and the segment is detectable as an off segment and a failure of the driver to a high or low state, that can source or sink current, is detectable as an on segment. The only coverage not provided is the mechanical leakage of the liquid crystal material from between the glass plates 10 and 11 in the LCD and the fading of the phosphor luminescence in the EL display. Neither leakage in the LCD or phosphor fading in the EL display, however, is critical since data is not misrepresented.

The LCD material sandwiched between the glass substrates 10 and 11 includes liquid crystal molecules 16. Light entering the front glass substrate 10 is polarized by the polarizer 14, reflected from the reflective surface 12 and retransmitted through the polarizer 14 to provide a silver appearance to the viewer. When an AC potential is applied between a transparent segment electrode 15 and the backplane 13, the liquid crystal molecules 16, in the vicinity of the energized electrode 15 experience a rotation or twist that rotates the axis of polarization as the polarized light is transmitted through the LCD material. This light is reflected from the reflective surface 12 but is blocked from reemerging through the front glass substrate 10 by the polarizer 14 since the direction of polarization of this light is no longer coincident with the axis of polarization of the polarizer 14. Thus, the energized segment 15 provides a black appearance to the viewer, thereby displaying the LCD information.

Figure 2B:
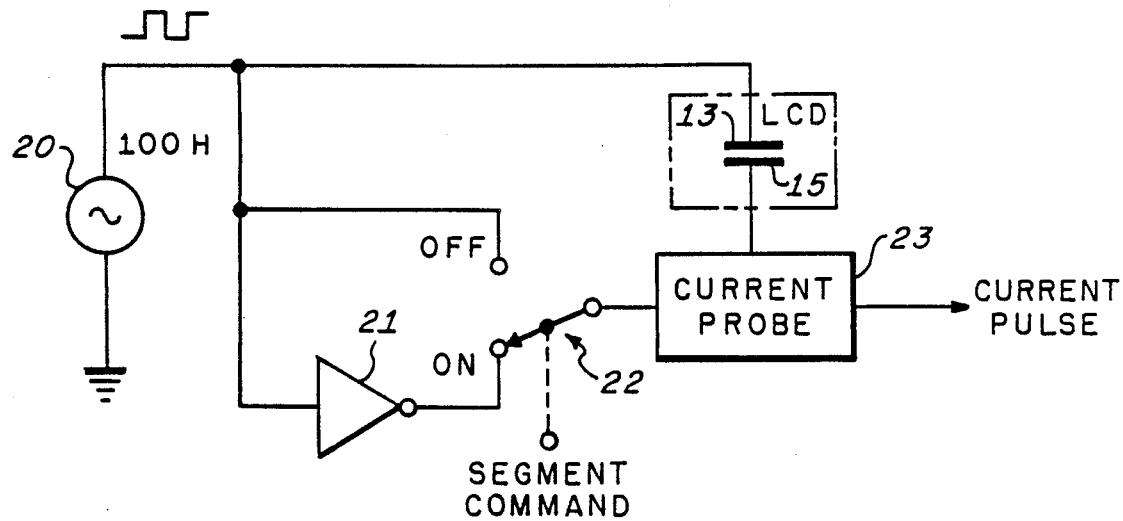
FIG. 2b is a schematic diagram illustrating the principles of LCD operation and a current probe for segment verification.
Figure 2C:
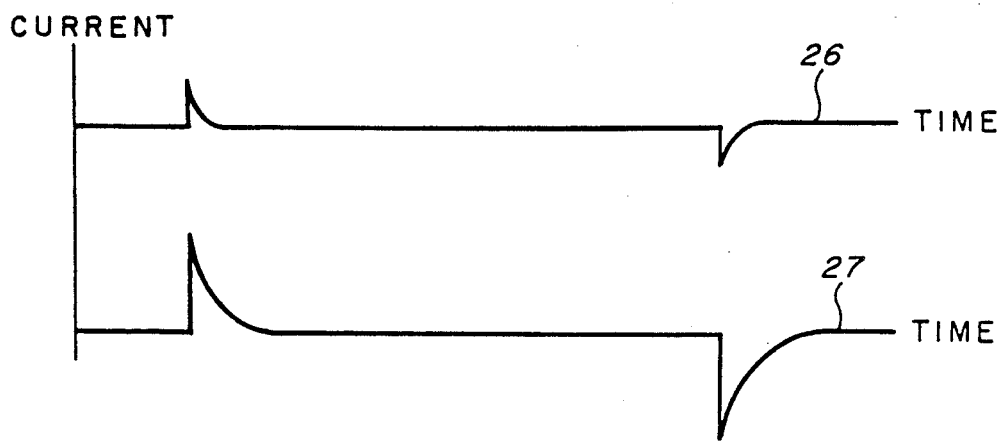
FIG. 2c is a graph of current pulses or spikes illustrating the characteristics that provide the basis for determining the status of capacitive type segmented displays.

Referring to FIG. 2b the principles of driving the LCD and determining segment status in accordance with the invention are illustrated. A 100 Hz square wave source 20 applies a 100 Hz square wave to the backplane electrode 13 of the LCD. The 100 Hz square wave is also applied directly and through an inverter 21 to an LCD segment electrode 15 via a single pole double throw switch 22. A current probe 23 is interposed between the switch 22 and the segment electrode 15. The segment command that determines if the segment should be on or off is applied to position the switch 22. When the switch 22 is in the off position the electrode 15 is driven by the 100 Hz square wave in phase with the backplane electrode 13. When the switch 22 is in the on position the electrode 15 is driven by the 100 Hz square wave through the inverter 21 and is thus driven 180° out of phase with the backplane electrode 13. Since an on segment electrode 15 is driven out of phase with the backplane electrode 13, the capacitive segment electrode 15 will be continually charging and discharging thus demanding current pulses. These current pulses are detected by the current probe 23 thus measuring the on status of the segment. Since an off segment electrode 15 is driven in phase with the backplane electrode 13, no current pulses are demanded. The current probe 23 detects this condition and provides a signal indicative of the off status of the segment. Thus, the current probe 23 verifies the status of the segments by the measurement of the current pulses required to charge the effective capacitance of each segment. Referring to FIG. 2c, the LCD current pulse characteristics utilized to measure the segment status are illustrated. Curve 26 depicts the current pulses detected for an off segment and curve 27 depicts the current pulses detected for an on segment. It is appreciated that the current pulses or spikes for an on segment are significantly larger in amplitude and greater in duration than those for an off segment.

In the preferred embodiment of the invention, a control unit formats incoming display data into appropriate form for the segmented display. The control unit converts the data into serial format and provides it to the display by a serial bus structure. The serial interconnect interface between the control unit and the display simplifies the apparatus and permits the display to be located remotely from the control unit. The display unit inputs the serial display data, converts the data to parallel, buffers the data, and drives the backplane and each display segment. The 100 Hz square wave oscillator 20 (FIG. 2b) is utilized to drive the segments in phase with the backplane for an off segment and out of phase with the backplane for an on segment.

Segment status determining circuitry utilizes the 100 Hz signal as a clock to synchronize the measurement of the current pulses between the display drivers and the capacitive segments of the display. An on segment continually charges and discharges thus demanding current pulses. An off segment does not require current pulses. These current pulses are sensed as one's or zero's which are loaded into a shift register utilized to transmit the segment status data to the control unit via the serial bus structure.

The serial status output data from the display is converted in the control unit to parallel and compared with the desired result. Two modes of operation are utilized. In one mode the output status data from the display is compared to the desired result each update frame of the control unit. Thus the control unit verifies segment status each time a frame of display data is transmitted to the display unit. In the second mode of operation, the control unit generates a test pattern which is transmitted to the display and the segment status data generated thereby is utilized to verify the display operational integrity. The display pattern alters and restores the display over a sufficiently short time interval that the human eye integration causes the pattern to be unnoticed by the user.

The following chart provides a failure analysis depicting detection responses for all types of display failures.

| FAILURE ANALYSIS CHART | | | | |
|---|---|---|---|---|
| FAILURE TYPE | SEG | CURRENT CHARACTERISTICS | DISPLAY CHARACTERISTICS | PULSE DET INDICATION |
| open driver, strip connector or LCD segment | ON | None | OFF | Off-detectable |
|  | OFF | None | OFF | Off-don't care |
| driver short to +5 or −22 | ON | ½ ON pulse | ON-reduced contrast | On-don't care |
|  | OFF | ½ ON pulse | ON-reduced contrast | On-detectable |
| segment to backplane short | ON | full current square wave until driver blows | OFF | when driver blows reverts to open driver case |
|  | OFF Same | None | OFF | OFF-don't care |
| segment to segment short | ON | normal pulse | ON | ON-don't care |
|  | OFF Opposite | none | OFF | OFF-don't care |
|  | On | full current square wave until driver blows | ON-reduced contrast | when driver blows reverts to open driver case |
|  | OFF | full current square wave until driver blows | ON-reduced contrast | when driver blows reverts to open driver case |
| segment to ground short | ON | ½ ON square wave | ON-reduced contrast | ON-don't care |
|  | OFF | ½ ON square wave | ON-reduced contrast | when driver blows reverts to open driver case |

It is appreciated from the Failure Analysis Chart that there are four types of waveforms that must be detected to provide complete failure protection; viz, (1) the lack of any current, (2) one-half magnitude current pulses, (3) a full current square wave, and (4) a one-half current square wave. From the chart it is appreciated that opens and driver shorts are detected utilizing the pulse waveforms and shorts involving the segments are detected utilizing the square wave waveform.

Referring to FIG. 3, a schematic block diagram of a system for driving and verifying an LCD in accordance with the invention is illustrated. The system of FIG. 3 includes a Control Unit 30, a Drive LCD Unit 31, a Determine Segment Status Unit 32 and a 100 Hz square wave clock 33. The Drive LCD Unit 31 provides segment driving signals to a liquid crystal display 34 via strip connectors 35. The LCD 34 comprises a plurality of display indicators with the backplane electrodes thereof receiving drive energization directly from the square wave clock 33.

The Control Unit 30 is preferably implemented by an 8051 microprocessor 36 that receives display data from an external source, not shown, at a port 37. The display data is received in parallel and reformatted by the control unit 30 into Serial Segment Data transmitted to the Drive LCD Unit 31 by a serial bus 38. The 8051 microprocessor 36 includes a main program 39 that provides overall control of the system. The main program 39 provides an interrupt signal on a line 40 and a Select Test Pattern Control signal on a line 41. In response to the interrupt signal, the microprocessor 36 reads a frame of update display data at the port 37. When the interrupt is not active, the microprocessor 36 loads the Serial Segment Data via the bus 38 into the Drive LCD Unit 31 and verifies the display utilizing the Determine Segment Status Unit 32. The main program 39 issues the Select Test Pattern Signal on the line 41 when the LCD 34 is to be verified with the test pattern.

The microprocessor 36 issues a load signal on a line 42 to the Drive LCD Unit 31 as well as a clock signal (CLK) on a line 43, a chip select signal (CS0) on a line 44 and a read signal on a line 45 to the Drive LCD Unit 31 and to the Determine Segment Status Unit 32. The microprocessor 36 also issues a SQ*/PUL signal on a line 46 to the Determine Segment Status Unit 32.

The CS0 signal on the line 44 is applied to AND gates 47, 48, and 49 to enable the chip. The microprocessor 36 also issues chip enable signals CS1–CS4 to enable other display chips (not shown) in the system.

The read signal on the line 45 is utilized by the microprocessor 36 to read the status of the segments from the Determine Segment Status Unit 32. Segment data is loaded when the microprocessor 36 is not reading status data. Thus, read-not is applied as an input to the AND gate 48 to enable the Drive LCD Unit 31 to receive the Serial Segment Data on the bus 38. The Drive Unit 31 includes a serial-in parallel-out input shift register 50 coupled to the serial bus 38 to receive the Serial Segment Data at the serial input (SI) thereof. The input shift register 50 receives the output of the AND gate 48 at the enable input thereof and the clock signal on the line 43 at the clock input thereof. Thus, when the read signal on the line 45 is low, the input shift register 50 is enabled to receive the Serial Segment Data on the bus 38 which is clocked in by the clock signal on the line 43.

The parallel output $Q_0$-$Q_N$ of the input shift register 50 is applied in parallel to a parallel-in parallel-out display register 51. The display register 51 is clocked by the load signal on the line 42 applied through the AND gate 47. Thus, when the microprocessor 36 issues the load strobe and CS0 is high, the contents of the input shift register 50 is latched in parallel into the display register 51.

The parallel output $DR_0$-$DR_N$ of the display register 51 is applied to segment buffer drivers 52. The buffer drivers 52 are responsive to the square wave signal from the clock 33 and the respective data bits from the display register 51 to provide a square wave signal that is either in phase or out of phase with the clock 33 at each of the buffer driver outputs $D_0$-$D_N$ in a manner to be described. The buffer driver outputs are applied through respective current probes 53 and the strip connector 35 to the respective segments of the LCD 34.

The current probes 53 are interposed between the buffer drivers 52 and the segments of the LCD 34, respectively, to provide the LCD segment drive via the outputs $S_0$-$S_N$ of the respective current probes 53 and the segment status signals via the current probe outputs $I_0$-$I_N$.

The segment status signals from the current probes 53 are applied as inputs to a parallel-in serial-out output shift register 54. The current probe outputs $I_0$-$I_N$ are strobed in parallel into the shift register 54 by a Sample Strobe signal on a line 55 from a Sample Control Circuit 56. The Sample Control Circuit 56 receives the SQ*/PUL signal on the line 46 to time the Sample Strobe on the line 55 in accordance with whether square wave or pulse mode segment status information is required by the microprocessor 36. The Sample Control Circuit 56 is also responsive to the square wave drive from the clock 33 for timing the Sample Strobe on the line 55.

The serial output (SO) of the output shift register 54 is applied to the serial bus 38 so as to provide Serial Segment Status Data to the microprocessor 36. The microprocessor 36 issues CLK on the line 43 to the clock input of the output shift register 54 to clock the Serial Segment Status Data onto the bus 38. The read signal on the line 45 is applied via the AND gate 49 to enable the output shift register 54 and the Sample Control Circuit 56 when the microprocessor 36 requires Segment Status Data. In a manner to be described, the microprocessor 36 reformats the Serial Segment Status Data into a parallel structure for comparison with the input display data provided at the port 37 so as to provide error status signals with respect to the segments of the LCD 34, respectively.

The microprocessor 36 contains software for inputting and issuing the data and control signals herein described. The primitive software elements are schematically illustrated as Input Segment Data 60, Load Display 61, Verify Display 62, Transmit 8 Bits 63, Input Segment Status 64, and Input 8 Bits 65. The microprocessor 36 also includes storage for Buffered Segment Data 66, Test Pattern 67, Error Maintenance Status 68, and Segment Status 69 as schematically illustrated. It is appreciated that the processes 60–65 with the exception of Transmit 8 Bits 63 and Input 8 Bits 65 are performed by the system software in a manner to be described in further detail hereafter. Processes 63 and 65 are performed by the serial port hardware of the 8051 microprocessor 36.

Referring to FIG. 4 details of the buffer drivers 52 of FIG. 3 are illustrated. The outputs $DR_0$-$DR_N$ from the display register 51 are applied as inputs to respective EXCLUSIVE OR gates 80. The other input to each of the gates 80 is provided by the 100 Hz square wave from the clock 33. The outputs of the EXCLUSIVE OR gates 80 are applied as inputs to respective high voltage buffer drivers 81. The respective outputs of the buffer drivers 81, $D_0$-$D_N$, are applied to the current probes 53 respectively. The drivers 81 provide the high voltage buffers required for dichroic type LCD's.

Thus, when a DR input to an EXCLUSIVE OR gate 80 is binary 1 (on segment) the 100 hz square wave is transmitted inverted through the gate. When the DR input to the gate is binary 0, the square wave is transmitted without inversion. Thus the buffer drivers 52 provide the process for driving the "on" segments out of phase with the backplane and the "off" segments in phase with the backplane.

Details of the Determine Segment Status Unit 32 (FIG. 3) are illustrated in FIGS. 5a, 5b, 6, 6a, and 6b. Three basic elements are utilized; viz, the current probes of FIGS. 5a or 5b, the output shift register 54 and the Sample Control Circuit of FIG. 6. FIGS. 6a and 6b illustrate waveforms and sample points illustrating the operations occuring in the SQ (square wave) mode and in the PUL (pulse) mode.

Referring to FIG. 5a, details of the current probes 53 are illustrated. Each current probe comprises a resistor 82 in series between the output of the buffer driver 52 and the LCD segment. A level detector 83 connected across the resistor 82 is set at ½ the peak current pulse. FIG. 5b illustrates an alternative current probe for utilization in the preferred embodiment of the invention. Each current probe is comprised of a photo emitter 84 connected in series between the output of the buffer driver and the segment of the LCD. A photo detector 85 responsive to the light output of the photo emitter 84 is set at a threshold of ½ the peak current pulse.

Referring to FIG. 6 details of the output shift register 54 and the Sample Control Circuit 56 are illustrated. The outputs $I_0$-$I_N$ of the current probes 53 are applied to the parallel input of the output shift register 54 wherein they are sampled at a time determined by the Sample Control 56. The Serial Segment Status Data provided at the serial output (SO) of the output shift register 54 is clocked onto the serial bus 38 by the clock signal from the microprocessor 36 on the line 43. The read signal on the line 45 and the chip select signal, CS0, on the line 44 enable the output shift register 54 via the AND gate 49. The output of the AND gate 49 is also applied as an input to an AND gate 86 to enable the Sample Control 56. The output of the AND gate 86 triggers a Sample Strobe circuit 87 to provide the Sample Strobe to the output shift register 54 on the line 55.

The 100 Hz square wave from the clock 33 through a 2.5 microsecond delay element 88 and through a 30 microsecond delay element 89 is applied as inputs to AND gates 90 and 91 respectively. The SQ*/PUL signal on the line 46 is applied as an input to the AND gate 90 and through and inverting input to the AND gate 91. In the pulse (PUL) mode, the SQ*/PUL signal enables the AND 90 and disables the AND gate 91. In the square wave (SQ) mode, the SQ*/PUL signal enables the AND gate 91 and disables the AND gate 90. The outputs of the AND gates 90 and 91 provide inputs to an OR gate 92 which in turn provides an input to the AND gate 86.

From the Failure Analysis Chart discussed above, there are four types of waveforms that must be discerned to provide full protection; viz, the lack of any current, current pulses of ½ magnitude, a full current square wave, and a ½ current square wave. Accordingly, the sample points utilized to determine segment status are illustrated in FIGS. 6a and 6b. In the pulse (PUL) mode, the "on" segment requires a current pulse of significantly greater magnitude and longer duration than that required by an "off" segment. The detection of a pulse for an "off" segment is caused by a failure in the segment driver. In the square wave (SQ) mode, the sample is taken at a time well after a pulse should have disappeared thus providing for detection of shorted elements. The SQ*/PUL control signal on the line 46 provided by the Control Unit 30 to the Sample Control Circuit 56 selects the type of sample to be verified. The Sample Control Circuit 56 provides the necessary delay of the 100 Hz display clock to strobe the sample line 55 to the output shift register 54.

Figure 7:
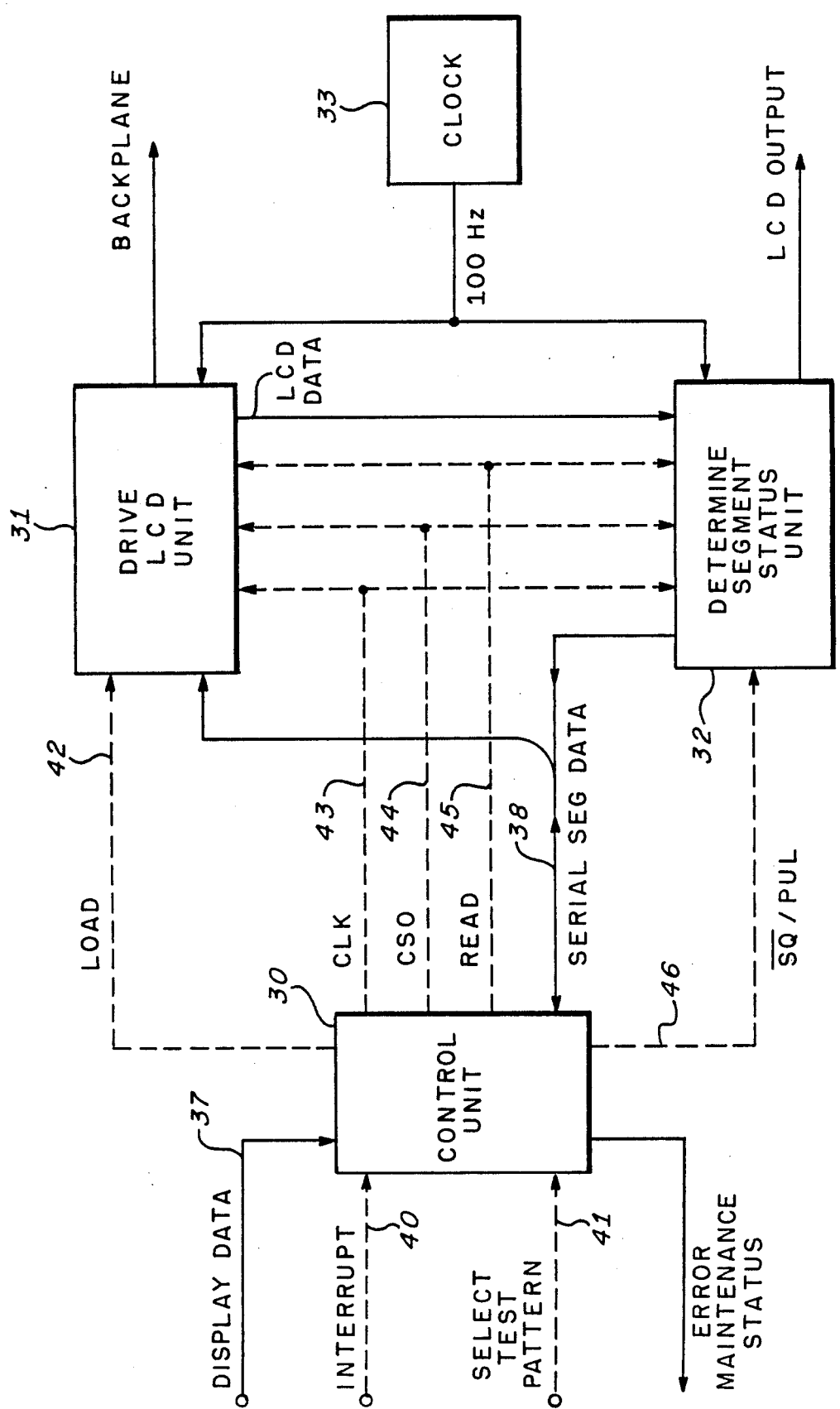
FIG. 7 is a top level data and control flow diagram for the system of FIG. 3.

Referring now to FIG. 7, a top level data and control flow diagram of the system of FIG. 3 for driving an LCD and verifying its status is illustrated. The control signals illustrated in dashed line are required to achieve the data flow illustrated in solid line. The Control Unit 30 receives Display Data from an external source. The data is reformatted by the Control Unit 30 into Serial Segment Data and transmitted to the Drive LCD Unit 31 via the serial bus 38. The Control Unit 30 also loads the store Error Maintenance Status 68 (FIG. 3) with the LCD error status. The Drive LCD Unit 31 supplies the Backplane energization and LCD Data to be transmitted to the LCD 34 (FIG. 3) utilizing the 100 Hz clock 33. Determine Segment Status Unit 32 inserts a current probe in series with the LCD Data to LCD Output path, sampling for current pulses timed by the 100 Hz clock 33. The Determine Segment Status Unit 32 then transmits to the Control Unit 30 the Serial Segment Data, via the serial bus 38, containing the segment status information.

The clock signal (CLK) on the line 43 is a timing control utilized to synchronize data bits between the Control Unit 30, the Drive LCD Unit 31, and the Determine Segment Status Unit 32. CS0, on the line 44, is a chip select control signal utilized to activate one of a multiplicity of displays and drives. Only one display activated by CS0 is illustrated herein for simplicity. The Select Test Pattern signal on the line 41 is a control signal provided by the main program utilized to select the Control Unit 30 mode of operation. As discussed above, the two selectable modes are; (1) sample and verify the display status after each update frame and, (2) at regular intervals issue and verify a test pattern for the Serial Segment Data. The SQ*/PUL signal on the line 46 is utilized to select segment status detection delays for square wave or pulse current detection.

Figure 8:
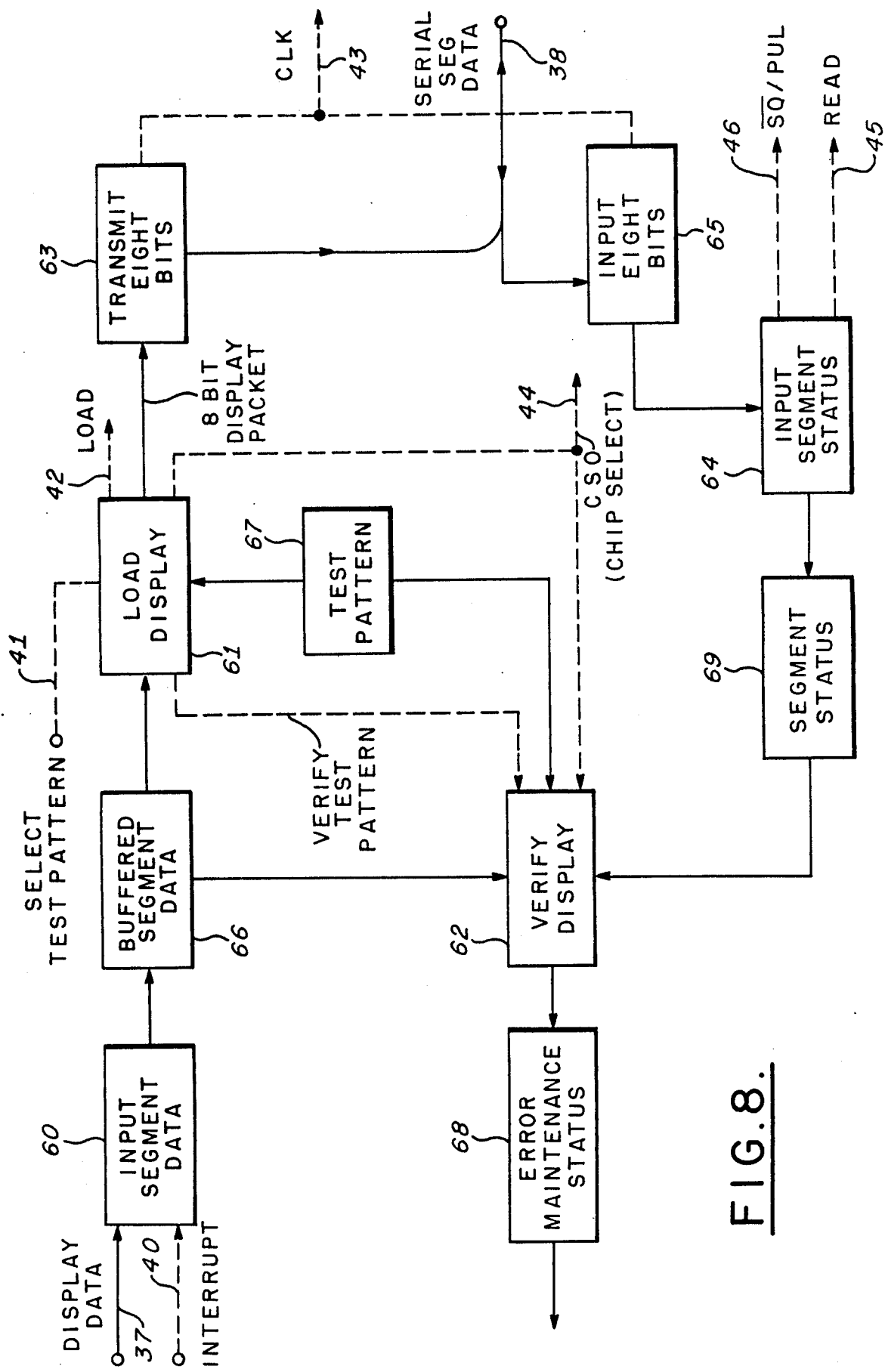
FIG. 8 is a lower level data and control flow diagram of the Control Unit of FIG. 7 illustrating the primitive software elements thereof.

Referring to FIG. 8 a lower level diagram is illustrated depicting the data flows, processes and control flows associated with the operation of the Control Unit 30. The data flow signals are illustrated in solid line and the control flow signals are illustrated in dashed line. The processes 60, 61, 62, and 64 are performed by software and the processes 63 and 65 are performed by the serial port hardware of the 8051 microprocessor 36 (FIG. 3). The operational description of each process, in Structured English, is as follows:

Input Segment Data 60
For each Interrupt
Load Display Data into Buffered Seg Data
End For
Load Display 61
For each processor frame time
If interrupt is not set
For each Display
Set CSn (chip select)
If Select Test Pattern is set
If this is 100 th frame since last test
Set Verify Test Pattern
Group Test Pattern into 8 Bit Display Packets
For each 8 Bit Display Packet
Activate Transmit 8 Bits 63
End For
Issue Load strobe
Activate Input Seg Status 64
Activate Verify Display 62
Reset Verify Test Pattern
End If
End If
Group Buffered Seg Data into 8 Bit Display Packets
For each 8 Bit Display Packet
Activate Transmit 8 Bits 63
End For
Issue Load strobe
Activate Input Segment Status 64
Activate Verify Display 62
End For
End If

```
-continued
End For
Verify Display 62
  For each segment
    If Verify Test Pattern is set
      If Segment Status bit is not equal to Test Pattern bit
        Set Error Maintenance bit
      End If
    Else
      If Segment Status bit is not equal to Buffered
        Seg Data bit
        Set Error Maintenance Status bit
      End If
    End Else
    If any bits of SQ Segment Status are set
      Set Error Maintenance Status bit
    End If
  End If
End For
Transmit 8 Bits 63
  For each 8 bit Display Packet
    For each bit
      If bit is a 1
        Set Serial Seg Data high
      Else
        Set Serial Seg Data low
      End Else
    End If
    Issue Clk pulse
    End For
  End For
Input Segment Status 64
  Set SQ*/PUL high
  Issue Read strobe
  For number of 8 Bit Status Packets for display
    Activate Input 8 Bits 65
    Group 8 Bit Status Packets into Pulse Segment Status
  End For
  Set SQ*/PUL low
  Issue Read strobe
  For number of 8 Bit Status Packets for display
    Activate Input 8 Bits 65
    Group 8 Bit Status Packets into SQ Segment Status
  End For
Input 8 Bits 65
  For 8 bits
    Input 1 bit of Serial Seg Data
    Issue Clk pulse
  End For
  Convert to parallel information
```

It is appreciated that detailed coding for implementing the software primitives illustrated and described herein is readily provided by the routineer in the art.

Figure 9:
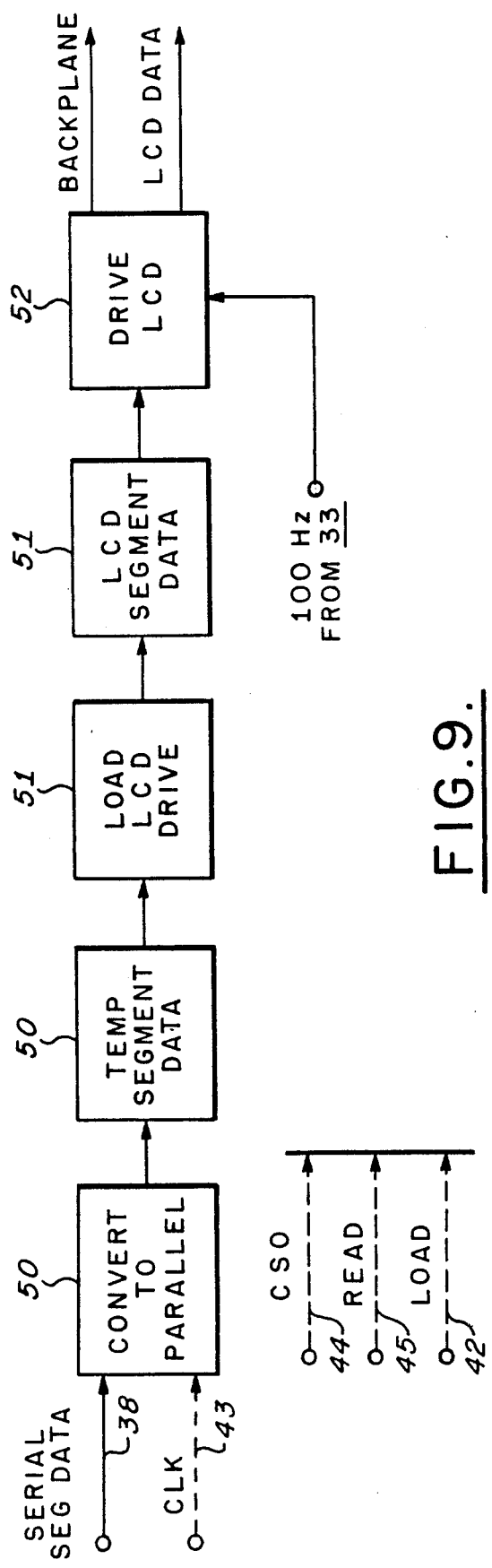
FIG. 9 is a lower level data and control flow diagram of the Drive LCD Unit of FIG. 7 which is implemented in hardware as illustrated in FIG. 3.

Referring to FIG. 9, lower level detailed data and control flow for the Drive LCD Unit 31 is illustrated. The input shift register 50 (FIG. 3) is represented by the combination of Convert to Parallel 50 and the Store-Temp Serial Data 50. Serial Segment Data on the serial bus 38 is clocked in on the rising edge of CLK on the line 43. The Load LCD Drive 51 combined with the Store-LCD Segment Data 51 form a latch which is implemented by the display register 51 of FIG. 3. This latch is clocked on the rising edge of the load signal on the line 42. The Drive LCD 52, implemented by the buffer driver 52 of FIG. 3, continually accesses the latched output from LCD Segment Data and provides the drive to the LCD segments.

Figure 10:
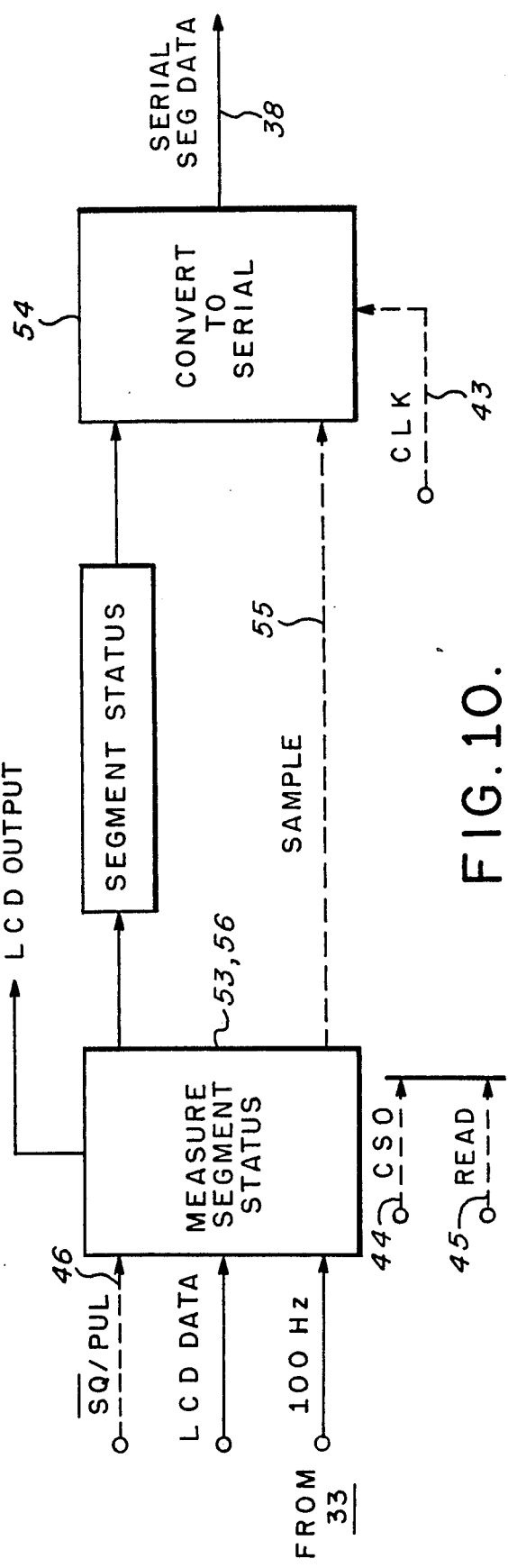
FIG. 10 is a lower level data and control flow diagram of the Determine Segment Status Unit of FIG. 7 which is implemented in hardware as illustrated in FIG. 3.

Referring to FIG. 10, lower level data and control flow details of the Determine Segment Status Unit 32 are illustrated. The current probes 53 (FIG. 3) on the LCD Data Segment Drives and the Sample Control Circuit 56 that measures the current pulses are represented by Measure Segment Status 53, 56. The output shift register 54 (FIG. 3) is represented by Convert to Serial 54. CS0 on the line 44 and read on the line 45 are enables provided by the Control Unit 30 when Segment Status Data is required. SQ*/PUL on the line 46 modifies the time delay in sampling the current as controlled by Measure Segment Status 53, 56. Measure Segment Status 53, 56 issues a Sample Strobe on the line 55 to Convert to Serial 54 when a sample is to be taken.

The present invention provides a system for displaying and verifying information with respect to segmented displays having a capacitive nature such as Liquid Crystal Displays or Electroluminescent Displays. Verification is automatic with each display update and is performed without user intervention or distraction. The invention provides an automatic fault self detection system.

While the invention has been described in its preferred embodiment, it is to be understood that the words which have been used are words of description rather than limitation and that changes may be made within the purview of the appended claims without departing from the true scope and spirit of the invention in its broader aspects.

I claim:

1. Apparatus for verifying the operational status of a digital display responsive to input display data, said display including display segments having a capacitive characteristic, said display including segment drivers for applying energization signals to said segments in accordance with said input display data, comprising:

segment status determining means including current probe means coupling said drivers to said segments for detecting current pulses resulting from applying said energization signals to said segments, said current pulses for an on segment being of substantially greater magnitude than said current pulses for an off segment because of said capacitive characteristic, said segment status determining means including means for providing segment status signals in accordance with said magnitude of said current pulses so as to detect whether a segment is on or off, and comparison means for comparing said segment status signals to said input display data with respect whether segments should be on or off for detecting discrepancies therebetween.

2. The apparatus of claim 1 wherein said current probe means includes:
   a resistor coupling said driver to said segment, and
   a level detector coupled to said resistor having a threshold set to distinguish between said current pulses for said on segments and said current pulses for said off segments.

3. The apparatus of claim 1 wherein said current probe means includes:
   a photoemitter coupling said driver to said segment, and
   a photodetector optically coupled to said photoemitter having a threshold set to distinguish between said current pulses for said on segments and said current pulses for said off segments.

4. The apparatus of claim 1 wherein said means for providing segment status signals includes sample control means for providing a sampling signal to control sampling said current probe means.

5. The apparatus of claim 4 wherein
   said energization signals selectively comprise square waves or pulse signals, and said sample control means includes means for selectively providing said sampling signal to sample said current probe means during the duration of an on segment current pulse when said energization signals comprise said pulse signals or for sampling said current probe means at a time after a current pulse for an on segment should have terminated when said energization signals comprise said square waves.

6. The apparatus of claim 1 wherein said comparison means comprises a Control Unit for receiving said input display data in parallel format, said Control Unit including means for converting said parallel input display data to serial format.

7. The apparatus of claim 6 wherein said display includes a serial-to-parallel converter for providing control signals to said segment drivers, respectively, said apparatus including serial bus means coupling said Control Unit to said display for conveying said input display data in serial format to said serial-to-parallel converter.

8. The apparatus of claim 7 wherein said means for providing segment status signals includes a parallel-to-serial converter responsive to said current probe means for converting said segment status signals to serial format for transmission to said Control Unit via said serial bus.

9. The apparatus of claim 8 wherein said control unit includes means for generating a test pattern for verifying the operational status of said digital display.

* * * * *